(12) United States Patent
Todd et al.

(10) Patent No.: US 10,240,374 B2
(45) Date of Patent: Mar. 26, 2019

(54) FLEXIBLE LIVING HINGE FOR AN IDENTIFICATION PULL TAB

(71) Applicant: HEWLETT PACKARD ENTERPRISE DEVELOPMENT LP, Houston, TX (US)

(72) Inventors: Eric Todd, Houston, TX (US); James Schulze, Houston, TX (US); Keith A. Sauer, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 91 days.

(21) Appl. No.: 15/472,657

(22) Filed: Mar. 29, 2017

(65) Prior Publication Data

US 2018/0283446 A1 Oct. 4, 2018

(51) Int. Cl.
| | | |
|---|---|---|
| *E05D 1/02* | (2006.01) | |
| *F16C 11/12* | (2006.01) | |
| *E05D 9/00* | (2006.01) | |
| *G09F 23/00* | (2006.01) | |
| *G09F 3/08* | (2006.01) | |

(52) U.S. Cl.
CPC ............... *E05D 1/02* (2013.01); *E05D 9/005* (2013.01); *F16C 11/12* (2013.01); *G09F 3/08* (2013.01); *G09F 23/00* (2013.01); *Y10T 16/525* (2015.01)

(58) Field of Classification Search
CPC . E05D 1/02; E05D 9/005; F16C 11/12; G09F 3/08; Y10T 16/525; Y10T 16/5253; Y10T 16/5257
See application file for complete search history.

(56) References Cited

U.S. PATENT DOCUMENTS

| | | | | | |
|---|---|---|---|---|---|
| 3,285,464 | A | * | 11/1966 | Boydman | E05D 1/02 220/377 |
| 3,592,354 | A | * | 7/1971 | Nielsen | E05D 1/02 16/225 |
| 3,615,035 | A | * | 10/1971 | Newton | E05D 1/02 16/225 |
| 3,618,161 | A | * | 11/1971 | Nozawa | B65F 1/1607 16/227 |
| 4,089,467 | A | * | 5/1978 | Makowicki | B65D 43/168 16/225 |
| 4,222,428 | A | * | 9/1980 | Scherer | E05D 1/02 160/231.1 |
| 4,518,092 | A | * | 5/1985 | Contreras, Sr. | A45D 40/22 206/581 |
| 4,563,381 | A | * | 1/1986 | Woodland | B29C 47/0028 16/225 |
| 4,828,132 | A | * | 5/1989 | Francis, Jr. | B65D 11/1853 16/225 |
| 5,013,073 | A | * | 5/1991 | Pehr | B65D 43/164 292/87 |

(Continued)

*Primary Examiner* — Jeffrey O'Brien
(74) *Attorney, Agent, or Firm* — Hewlett Packard Enterprise Patent Department

(57) ABSTRACT

Examples disclosed herein relate to a flexible living hinge for an identification pull tab. The flexible living hinge has a first shot area with a first portion of a first material and a second portion of a second material. The first portion has a first spring tail and a second sprint tail for attachment to a surface of a product and the second portion has a flat surface. A second shot area of a third flexible material is connected to the first portion and the second portion of the first shot area.

18 Claims, 3 Drawing Sheets

(56) References Cited

U.S. PATENT DOCUMENTS

| | | | | | |
|---|---|---|---|---|---|
| 5,137,260 | A * | 8/1992 | Pehr | B65D 43/164 | 215/216 |
| 5,851,634 | A * | 12/1998 | Andersen | B01F 3/1214 | 428/159 |
| 6,003,203 | A * | 12/1999 | Fowlston | B65D 43/168 | 16/225 |
| 6,332,285 | B1 * | 12/2001 | Aaldenberg | B42F 21/065 | 229/67.1 |
| 6,574,834 | B2 * | 6/2003 | Fedon | A45C 13/007 | 16/225 |
| 6,784,359 | B2 * | 8/2004 | Clark | B64G 1/222 | 136/245 |
| 7,047,576 | B2 * | 5/2006 | Tavivian | A47K 3/30 | 16/225 |
| 7,861,374 | B2 * | 1/2011 | Verdicchio | E05D 1/02 | 16/225 |
| 8,016,153 | B2 * | 9/2011 | Boenig | A45C 13/005 | 220/4.22 |
| 8,191,204 | B2 * | 6/2012 | Belfiore | E05D 1/02 | 16/225 |
| 8,438,702 | B2 * | 5/2013 | Apgar | B32B 25/10 | 16/225 |
| 8,540,452 | B2 * | 9/2013 | Jimenez | F16C 11/12 | 403/220 |
| 8,763,913 | B2 * | 7/2014 | Alo | G06K 19/07327 | 235/487 |
| 8,906,100 | B2 * | 12/2014 | Jimenez | F16C 11/12 | 623/17.16 |
| 8,999,474 | B2 * | 4/2015 | Casteras | B64G 1/222 | 16/221 |
| 9,487,297 | B2 * | 11/2016 | Long | B64C 1/1469 | |
| 9,772,659 | B2 * | 9/2017 | Xin | E05D 15/0621 | |
| 9,797,439 | B2 * | 10/2017 | Masini | E05D 1/00 | |
| 9,908,662 | B2 * | 3/2018 | Campagna | B65D 19/16 | |
| 9,964,142 | B2 * | 5/2018 | Rubel | B23K 26/0619 | |
| 9,970,222 | B1 * | 5/2018 | Ardelean | E05D 1/00 | |
| 10,012,262 | B2 * | 7/2018 | Rubel | B23K 26/0619 | |
| 2002/0195177 | A1 * | 12/2002 | Hinkley | C22F 1/006 | 148/559 |
| 2004/0016714 | A1 * | 1/2004 | Wood | B65D 47/0814 | 215/235 |
| 2004/0078890 | A1 * | 4/2004 | Tavivian | A47K 3/30 | 4/596 |
| 2004/0111836 | A1 * | 6/2004 | Lagler | B65D 47/0809 | 16/225 |
| 2004/0111942 | A1 * | 6/2004 | Stonehocker | G09F 3/005 | 40/661.06 |
| 2009/0106884 | A1 * | 4/2009 | Bemis | A47K 13/12 | 4/236 |
| 2009/0274512 | A1 * | 11/2009 | Tavivian | A47K 3/30 | 403/354 |
| 2011/0030410 | A1 * | 2/2011 | Ciyanoglu | E05D 1/02 | 62/331 |
| 2012/0110784 | A1 * | 5/2012 | Hsu | G06F 1/1681 | 16/226 |
| 2013/0276266 | A1 * | 10/2013 | Pendarvis | E05D 1/02 | 16/225 |
| 2014/0201951 | A1 * | 7/2014 | Starken | B42F 1/006 | 24/67.5 |
| 2014/0317881 | A1 * | 10/2014 | Heim | E05D 1/02 | 16/221 |
| 2017/0219007 | A1 * | 8/2017 | Lang | E05D 1/00 | |

* cited by examiner

FLEXIBLE LIVING HINGE FOR AN IDENTIFICATION PULL TAB

BACKGROUND

Product identification is an essential tool in any industry. From supply chain tracking to inventory management to brand protection, it is often necessary for a user to have access to identifying information about a product. Such identifying information may include a unique serial number, a product model name, a part number, a product brand, an IP address, product safety information, or any other useful information for identifying a product. The identifying information is typically placed on a label that is attached or connected to the product. The label may be visible in plain sight or discoverable to a user of the product. For example, a computer may have a serial number displayed in a label affixed in its back, a smart phone may have a serial number discoverable by a user by accessing a menu, a car may have a vehicle identification number on its dashboard, and so on. Whether visible or discoverable, the product identification label must be accessible by a user to be able to identify the product.

Accessibility of a product identification label often depends on the type of product. In complex machinery or large product equipment, the product identification label may be placed in a cumbersome location that is difficult to access. A user may have to move heavy equipment or navigate through a web of cables before obtaining the desired information from the product identification label. In some products, the product identification label may protrude out of the product by a pull tab. The pull tab may be placed in front of the product, making it less cumbersome for a user to access it. However, if not properly secured in place, the tab may fall out of the product all together. Frequent pulls of the tab may also damage it over time. The tab may break and become unusable for providing product identification information.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

A flexible living hinge for an identification pull tab is disclosed. The identification pull tab connects two sturdy materials with a portion of flexible material to provide flexibility in bending while keeping it durable and robust over time. The identification pull tab may be manufactured with a two-shot overmold process to ensure that the materials are held together with a chemical bond. A mechanical interlock is incorporated into the identification pull tab to further its durability. The flexible material effectively creates a living hinge at which the identification pull tab may be bent up and down for easy viewing and accessibility of product identification information. The product identification information may be placed in a top and/or a bottom label affixed to the identification pull tab.

Figure 1A:
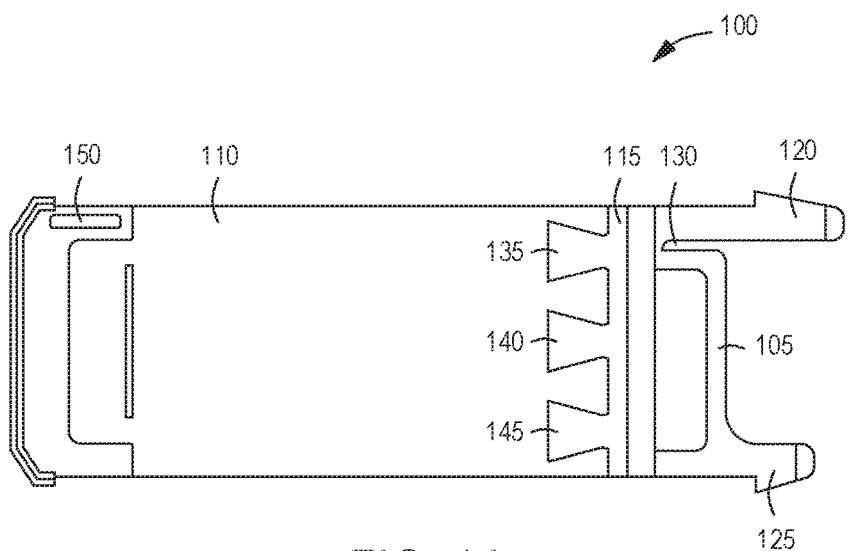
FIG. 1A is a schematic diagram of a top view of a flexible living hinge for an identification pull tab in accordance with various examples.

Referring now to FIG. 1A, a schematic diagram of a top view of a flexible living hinge for an identification pull tab in accordance with various examples is described. Identification pull tab 100 is a pull tab that attaches to and extends out of a product for enabling a user of the product to access identification information about the product. The identification information may include a unique serial number, a product model name, a part number, a product brand, an IP address, product safety information, or any other useful information for identifying the product. The identifying information may be displayed in a label affixed to the identification pull tab 100.

Identification pull tab 100 has a first shot area and a second shot area that are formed in a two-shot overmold process. The first shot area is divided into a first portion 105 and a second portion 110. First portion 105 is made of a sturdy plastic material, such as, for example, a polycarbonate resin, to ensure that the identification pull tab 100 will be securely attached in place to a product. Second portion 110 is also made of a sturdy plastic material, such as, for example, a polycarbonate acrylonitrile butadiene styrene thermoplastic. The material used for the first portion 105 may be chosen to be stronger than the material used for the second portion 110 to allow for the identification pull tab 100 to be durable and resistant to any damage made by extending it out of the product. As shown in FIG. 1A, second portion 110 has a flat surface sized to accommodate a label containing product identification information.

Attachment to a product is made with spring tails 120-125, with spring tail 120 having a longer dimension than spring tail 125 and an adjacent undercut 130 to facilitate rotation or other movement of the identification pull tab 100 when it is extended out of a product. It is appreciated that spring tails 120-125 may be designed according to the product that the identification pull tab 100 is to identify. In the example later described with reference to FIG. 3, the identification pull tab 100 is designed to attach to a computer server that may be placed in a large rack containing a number of such servers.

The identification pull tab 100 is also designed to be flexible to allow for it to be bent repeatedly up or down during use. A user may choose to bend the identification pull tab 100 up or down as desired to view any identification information that is displayed in a label affixed to the second portion 110 of the first shot area. Flexibility and robustness are introduced with the second shot area 115, which may be made of a flexible, rubber-like material. For example, second shot area 115 may be made with a thermoplastic elastometer material that is at the same time bendable but robust to repeated bents. It is appreciated that the materials used for first portion 105, second portion 110 and second shot area 115 may be chosen to meet any safety requirements for the product identified by the identification pull tab 100.

Figure 1B:
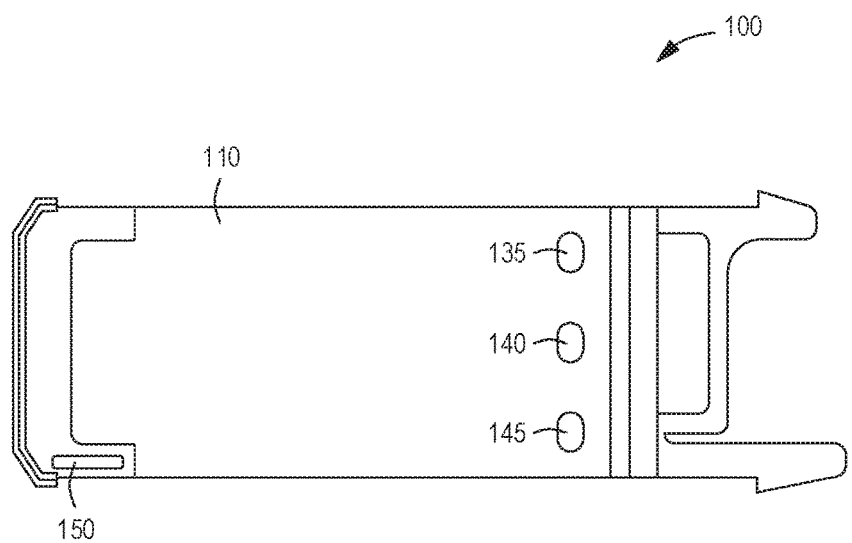
FIG. 1B is a schematic diagram of a bottom view of a flexible living hinge for an identification pull tab in accordance with various examples.

As illustrated, the second shot area 115 is molded between the first portion 105 and the second portion 110 of the first shot area. Doing so enables the second shot area 115 to be held in place with a strong chemical bond. FIG. 1B shows a back view of identification pull tab 100, illustrating the back of portions 135-145 of the second shot area 115. It is appreciated that the second shot area 115 is designed with these three portions 135-145 to ensure as much durability and robustness as possible while still providing the flexibility desired in bending the identification pull tab 100 repeatedly over its use-life. It is also appreciated that the back of second portion 110 as shown in FIG. 1B may also be used for an identification information label, thereby providing a user a way to view product identification information either by bending the identification pull tab 100 up or down as it extends out of the product it identifies. It is further appreciated that the second shot area 115 effectively creates a living hinge, with its flexibility and durability characteristics enabled by its design and its surrounding sturdy first and second portions 105-110 of the first shot area. In various examples, identification pull tab 100 may have an indentation 150 that may be used for various purposes, including for attaching it in place during shipping of the product that the identification pull tab 100 is used to identify.

Figure 2:
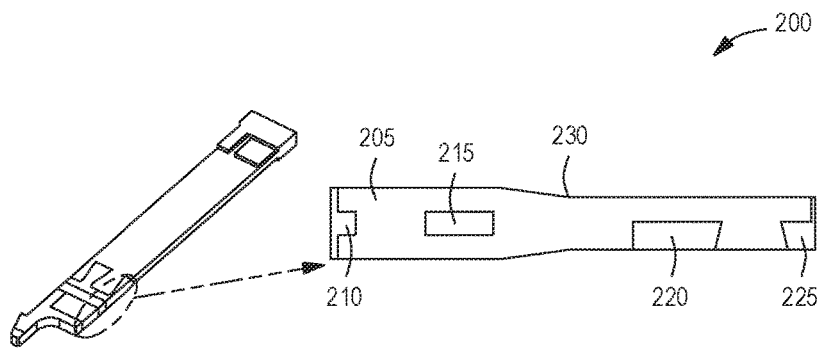
FIG. 2 is a schematic diagram of a side view of a flexible living hinge for an identification pull tab in accordance with various examples.

Attention is now directed to FIG. 2, which illustrates a schematic diagram of a side view of a flexible hinge for an identification pull tab in accordance with various examples. Identification pull tab 200 is shown with a side view of a first shot area illustrated by segments 210-225 and a second shot area 205. Segments 210-225 are designed as part of a two-shot overmold process to ensure that a mechanical interlock is built into the identification pull tab 200. Doing so adds robustness into the identification pull tab 200 to ensure it will remain intact with repeated pulls and bents. As illustrated, an angle 230 is also designed into the identification pull tab 200 to provide for further robustness while achieving its flexibility in bending.

Figure 3:
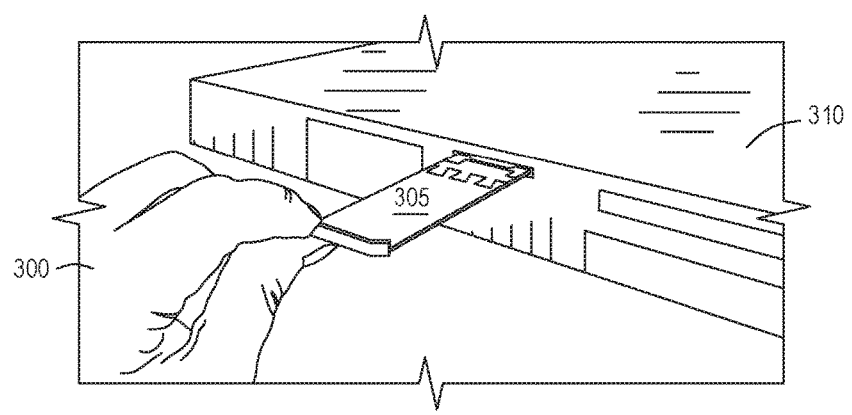
FIG. 3 is a schematic diagram of a user pulling an identification pull tab from a computer server in accordance with various examples.

Referring now to FIG. 3, a schematic diagram showing a user pulling an identification pull tab from a computer server in accordance with various examples is described. User 300 is shown pulling identification pull tab 305 out of a computer server 310. The identification pull tab 305 is attached securely in place by spring tails in a first portion of a first shot area. A second shot area enables the identification pull tab 305 to be bent up or down while maintaining its robustness and durability over time and ensuring the identification pull tab 305 will be firmly secured in place and not fall out of the computer server 310.

Figure 4A:
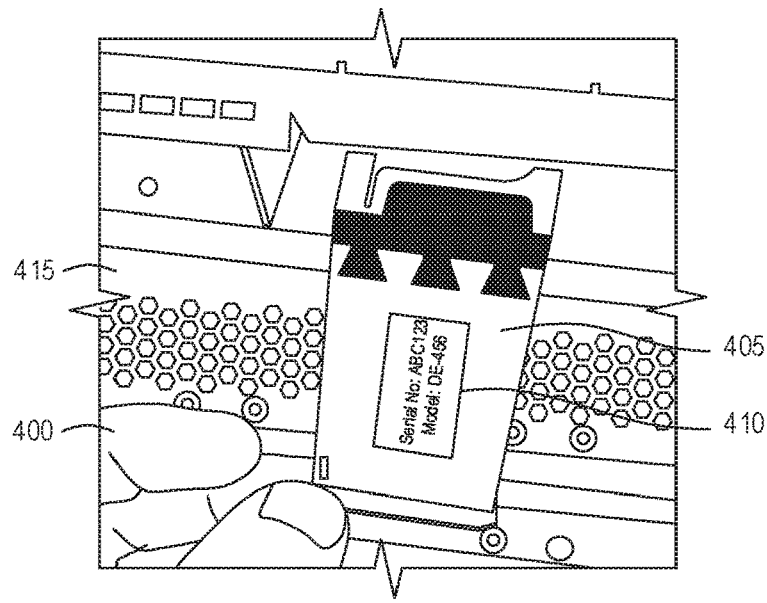
FIG. 4A is a schematic diagram of a user pulling an identification pull tab from a computer server and bending the identification pull tab down to view product identification information in accordance with various examples.
Figure 4B:
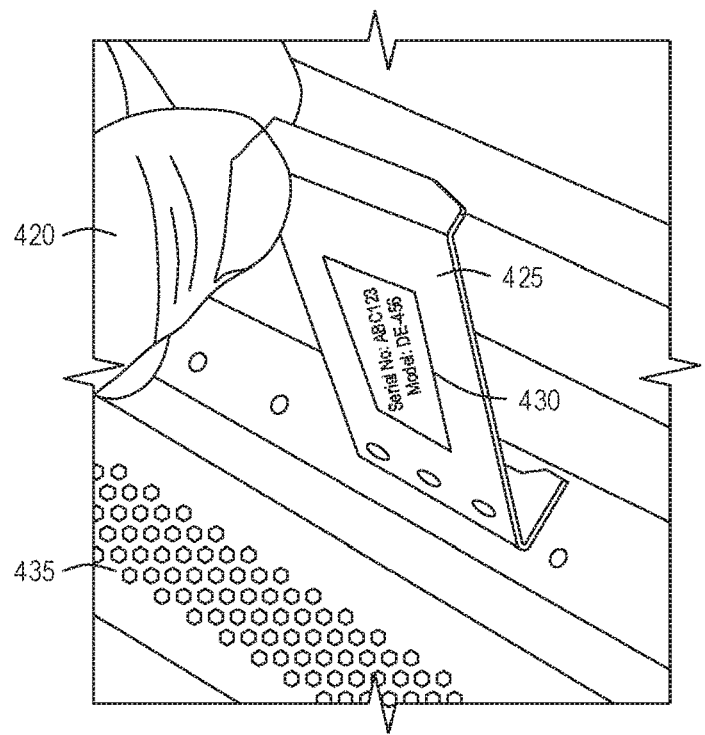
FIG. 4B is a schematic diagram of a user pulling an identification pull tab from a computer server and bending the identification pull tab up to view product identification information in accordance with various examples.

Attention is now directed to FIGS. 4A-B, illustrating a user pulling an identification pull tab from a computer server and bending the identification pull tab down (FIG. 4A) and up (FIG. 4B) to view product identification information in accordance with various examples. In FIG. 4A, user 400 bends identification pull tab 405 down to view identification information label 410, showing a serial number and a model number for computer server 415. In FIG. 4B, user 420 bends identification pull tab 425 up to view identification information label 430, to reveal a serial number and a model number for a computer server 435. It is appreciated that the design of the identification pull tabs 405 and 425 as described above with reference to FIGS. 1A, 1B and 2 enables the identification pull tabs 405 and 425 to be bent repeatedly up or down and remain securely attached in place. It is also appreciated that having identification pull tabs 405 and 425 extend out of the computer servers 415 and 435 respectively, enables users to easily view product identification information repeatedly over the use-life of computer servers 415 and 435 without damaging or tearing the identification pull tabs 405 and 425.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A flexible living hinge for an identification pull tab, comprising:
    a first shot area having a first portion of a first material and a second portion of a second material;
    a second shot area of a third flexible material, the second shot area is molded between the first portion and the second portion of the first shot area for allowing the second portion to bend relative to the first portion about a hinge axis;
    the first portion having a first spring tail and a second spring tail, the first spring tail and the second spring tail each extending substantially perpendicular to the hinge axis and having an end configured for locking insertion into a surface of a product; and
    the second portion having a flat surface and a mechanical interlock configured to receive the second shot area of the third flexible material within the second portion.

2. The flexible living hinge of claim 1, wherein the first material and the second material are plastics.

3. The flexible living hinge of claim 2, wherein the first material comprises a polycarbonate resin.

4. The flexible living hinge of claim 2, wherein the second material comprises a polycarbonate acrylonitrile butadiene styrene thermoplastic.

5. The flexible living hinge of claim 1, wherein the first portion comprises an undercut adjacent to the first spring tail configured for allowing the first spring tail to be moved in a direction substantially parallel to the hinge axis for removal from the surface of the product.

6. The flexible living hinge of claim 1, wherein the flat surface comprises a top and a bottom flat surface area for placement of a product identification label.

7. The flexible living hinge of claim 1, wherein the third material comprises a thermoplastic elastomer material.

8. The flexible living hinge of claim 1, wherein the second shot area is molded between the first portion and the second portion of the first shot area via the mechanical interlock and a chemical bond.

9. The flexible living hinge of claim 8, wherein the chemical bond is formed during a two-shot overmold process.

10. A flexible living hinge for an identification pull tab, comprising:
    a first shot area having a first portion of a first material and a second portion of a second material;
    a second shot area of a third flexible material, the second shot area is molded between the first portion and the second portion of the first shot area for allowing the second portion to bend relative to the first portion about a hinge axis;

the first portion having a first spring tail and a second spring tail, the first spring tail and the second spring tail each extending substantially perpendicular to the hinge axis and having a barbed end configured for insertion into a surface of a computer server; and the second portion having a flat surface and a dovetail shaped mechanical interlock configured to receive the second shot area of the third flexible material.

11. The flexible living hinge of claim 10, wherein the first material and the second material are plastics.

12. The flexible living hinge of claim 11, wherein the first material comprises a polycarbonate resin.

13. The flexible living hinge of claim 11, wherein the second material comprises a polycarbonate acrylonitrile butadiene styrene thermoplastic.

14. The flexible living hinge of claim 10, wherein the first portion comprises an undercut adjacent to the first spring tail configured for allowing the first spring tail to be moved in a direction substantially parallel to the hinge axis for removal from the surface of the computer server.

15. The flexible living hinge of claim 10, wherein the flat surface comprises a top and a bottom flat surface area for placement of a product identification label.

16. The flexible living hinge of claim 10, wherein the third material comprises a thermoplastic elastomer material.

17. The flexible living hinge of claim 10, wherein the second shot area is molded between the first portion and the second portion of the first shot area via the mechanical interlock and a chemical bond.

18. The flexible living hinge of claim 17, wherein the chemical bond is formed during a two-shot overmold process.

* * * * *